United States Patent [19]

Nitschke

[11] Patent Number: 4,475,937

[45] Date of Patent: Oct. 9, 1984

[54] CONVEYOR CONTROLLER FOR GLASS SHEET PROCESSING EQUIPMENT

[75] Inventor: John S. Nitschke, Perrysburg, Ohio

[73] Assignee: Glasstech, Inc., Perrysburg, Ohio

[21] Appl. No.: 414,088

[22] Filed: Sep. 1, 1982

[51] Int. Cl.³ .............................................. C03B 35/00
[52] U.S. Cl. ........................................ 65/163; 65/273;
   65/DIG. 13; 198/461; 364/469; 364/473
[58] Field of Search ................... 65/163, DIG. 13, 273;
   198/461; 364/469, 473

[56] References Cited
U.S. PATENT DOCUMENTS

3,894,627 7/1975 Jabbusch et al. .................... 198/461
3,992,182 11/1976 Frank .................................. 65/163 X
4,364,766 12/1982 Nitschke ............................... 65/163

Primary Examiner—Arthur Kellogg
Attorney, Agent, or Firm—Brooks & Kushman

[57] ABSTRACT

A programmable, microprocessor-based controller is responsive to a displacement command signal and first and second transport signals corresponding to the distance that glass sheets are conveyed on main and auxiliary conveyors, respectively, to provide a speed control signal to a separate, variable speed drive. The variable speed drive drives the auxiliary conveyor independently of the driven main conveyor. The variable speed drive is controlled by the controller to: (1) reduce the rate of glass sheet conveyance; (2) reposition the leading and trailing glass sheets, if necessary, along the direction of conveyance; and (3) insure that as each glass sheet is transferred between the main conveyor and the auxiliary conveyor, the auxiliary conveyor is driven at the same speed as the main conveyor.

5 Claims, 7 Drawing Figures

CONVEYOR CONTROLLER FOR GLASS SHEET PROCESSING EQUIPMENT

CROSS-REFERENCE TO RELATED APPLICATIONS

This application is related to and incorporates by reference the entire disclosures of co-pending applications entitled "Roll Operator for Glass Sheet Conveyor of Bending System", U.S. Ser. No. 310,332, filed Oct. 13, 1981, now U.S. Pat. No. 4,360,374; and "Control System for Monitoring and Controlling the Processing of Glass Sheets in a Glass Processing Environment", U.S. Ser. No. 363,689 filed Mar. 30, 1982 now U.S. Pat. No. 4,364,766.

TECHNICAL FIELD

This invention relates generally to controllers for conveyor positioning drives and, more particularly, to controllers for conveyor variable speed drives used in glass sheet processing systems.

BACKGROUND ART

Prior glass sheet processing systems such as, for example, the ones disclosed by U.S. Pat. Nos. 3,778,244, 4,202,681, 4,204,854, and 4,282,026 include bending apparatus having a holder positioned within a heating chamber above a roller conveyor to receive a heated glass sheet from the conveyor in preparation for bending. High quality glass can be achieved with this type of system if the conveyance is continued as the glass sheet is received by the holder from the conveyor since the glass sheet is then never stationary on the rollers in a manner that can result in roller marking of the lower glass surface. However, continued conveyance of the glass sheet as it is received by the holder necessarily results in sliding between the upper surface of the glass sheet and a downwardly facing surface of the holder. The surface material of the holder at which the sliding takes place must be capable of withstanding the sliding action and the heat involved without marking the upper surface of the glass sheet in its softened state. After the holder receives the heated glass sheet, a mold is moved under the holder and receives the heated glass sheet for bending. In certain applications, subsequent rapid cooling of the bent glass sheet provides tempering thereof to increase the glass strength and resistance to breakage.

Quite often, a pair of symmetrical right and left glass sheets are simultaneously bent such as in the manufacturing of right and left windows for vehicles. When a pair of sheets are bent on the type of system discussed above, it is conventional for one sheet to be conveyed forward of the other sheet in leading and trailing positions as the sheets are heated from room temperature to a sufficiently high temperature for bending. After the glass sheets have been conveyed for a sufficient distance to be heated to the required temperature, the longitudinal spacing therebetween along the direction of conveyance can change from the initial position due to slippage between the conveyor rollers and the glass sheets. Since the molds which receive the glass sheets from the holder are positioned in a fixed relationship with respect to each other, it is important for the glass sheets to be uniformly spaced with respect to each other and at the same location on the holder during each cycle in order to perform bending of both sheets to the desired shape. Repositioning of the glass sheets with respect to each other can be accomplished by holding one sheet as the conveyance of the other continues. However, such repositioning results in slippage between the sheet that is held and the rolls of the conveyor and can produce scratches on the lower roll supported glass surfaces.

DISCLOSURE OF THE INVENTION

One object of the present invention is to provide a controller for a variable speed drive that drives an auxiliary conveyor which is located adjacent a main conveyor in a glass sheet bending system so that sliding of a glass sheet is reduced upon being moved between the auxiliary conveyor and the main conveyor as the conveyance of the other glass sheets on the main conveyor is continued.

Another object of the present invention is to provide a controller for a variable speed drive that drives an auxiliary conveyor which is located adjacent a main conveyor in a glass sheet bending system so, if needed, the leading and trailing glass sheets can be repositioned with respect to each other without any slippage between the sheets and the conveyors.

A further object of the present invention is to provide a controller for a variable speed drive that drives an auxiliary conveyor which is located adjacent a main conveyor in a glass sheet bending system so that the auxiliary conveyor is controllably driven at a speed substantially equal to the speed of the main conveyor during transfer of the glass sheet between the main conveyor and the auxiliary conveyor in order to prevent marking of the glass.

The glass sheet bending system includes main and auxiliary horizontal conveyors for conveying glass sheets. A drive mechanism drives the main conveyor to convey heated glass sheets supported thereby. Bending apparatus of the system receives heated glass sheets to perform the bending. A separate operator of the system operates the auxiliary conveyor to control movement thereof and glass sheet conveyance thereon independent of the glass sheet conveyance on the main conveyor.

The operator comprises a variable speed drive for driving the auxiliary conveyor independently of the main conveyor to provide control of glass sheet conveyance. The controller controls the positioning drive to provide a controlled rate of conveyance to reduce sliding of the glass sheet.

The variable speed drive is controlled by the controller to increase or decrease the rate of conveyance on the auxiliary conveyor to reposition the glass sheets when needed. When the system with the positioning drive is utilized to simultaneously bend two glass sheets, two speed changes of the variable speed drive are sequentially performed to initially reposition the glass sheets with respect to each other and to thereafter reduce the rate of conveyance adjacent the bending apparatus to decrease the sliding that takes place as the glass sheets are received thereby from the auxiliary conveyor.

The variable speed drive is also controlled by the controller to drive the auxiliary conveyor at the same rate that the main conveyor is driven at the time glass sheet transfer occurs between the main and auxiliary conveyors and, preferably, at all times that the glass sheets are not being removed or repositioned.

In its preferred construction, the variable speed drive includes a first continuous drive loop that drives the rolls of the auxiliary conveyor and the drive mechanism includes a second continuous drive loop for driving the rolls of the main conveyor. A pair of the first continuous drive loops and a pair of the second continuous drive loops are most preferably provided to drive their respective rolls, and a horizontal support surface is associated with each drive loop with each drive loop slidably supported thereby and the associated rolls supported thereon for frictional driving. Both pairs of drive loops preferably comprise chains, and the positioning drive loops are most preferably roller chains that are driven by an electric motor under the control of the controller of the present invention.

The glass sheet bending system includes a furnace defining a heating chamber through which glass sheets are conveyed for heating in preparation for the bending. The bending apparatus of the preferred system includes a holder received within the heating chamber above the auxiliary conveyor for receiving heated glass sheets therefrom and also includes a bending mold or a pair of such molds for receiving the glass sheets from the holder for the bending.

A control system monitors and controls the processing of a conveyed sheet of glass in the sheet bending system which operates at relatively high production rates. The control system insures that the glass sheet bending system bends glass sheets without damage to either the glass sheets or the bending system.

The control system preferably includes sensor means located along the path of conveyance for sensing the pieces of glass as the pieces of glass are conveyed by the main conveyor. The sensor means provides a glass sense signal upon sensing each piece of glass. A first generating means is coupled to the main conveyor for generating a first transport signal corresponding to the distance that the glass sheets are conveyed along the path of conveyance. A master controller processes the glass sense and transport signals corresponding to each glass sheet to provide a command signal.

In carrying out the above objects and other objects of the invention a positioning controller is provided for controlling the variable speed drive. The positioning controller includes the first generating means and a second generating means coupled to the auxiliary conveyor for generating a second transport signal corresponding to the distance that glass sheets are conveyed along the path of conveyance on the auxiliary conveyor. A slave controller processes the command signal and the first and second transport signals to provide at least one control signal to control glass sheet conveyance on the auxiliary conveyor independent of the glass sheet conveyance on the main conveyor.

A preferred embodiment of the sensor means includes a source located on one side of the glass path for emitting radiant energy transverse the path of glass conveyance and a receiver located on the opposite side of the glass path for receiving the emitted radiant energy.

Preferably, the positioning controller provides a control signal to the variable speed drive to enable it to adjust the position of one piece of a plurality of pieces of glass relative to another piece of the plurality of pieces of glass if necessary.

The sensor means preferably is located at a predetermined position along the longitudinal length of the heating chamber downstream from a positioning station for sensing the pieces of glass as the pieces of glass are conveyed. The master controller is responsive to the glass sense signal of the sensor means to provide the command signal to the slave controller which preferably comprises a slave computer which, in turn, emits a digital control signal which is converted into an analog signal and provided to the variable speed drive so that the glass sheets are picked up without damaging either the glass sheets or the bending apparatus at the bending station.

Preferably, the master controller is a programmable computer which can accept various set points from an interconnected operator console unit corresponding to various physical parameters of the glass bending system.

The advantages occurring from the use of this type of control system are several. First, the amount of hardware and control instrumentation in the furnace environment is kept at a minimum, most control equipment of the control system including an operator console and other various control circuits can be located remotely from the furnace environment, for example, in an operator control room. Secondly, the control system affords great flexibility in this application; the position of a photoelectric sensor pair can be changed along the longitudinal length of the conveyor and the set points utilized by the control system can be altered so that no alteration of the hardware is required.

The above objects, and other objects features and advantages of the present invention are readily apparent from the following detailed description of the best mode for carrying out the invention when taken in connection with the accompanying drawings.

BEST MODE FOR CARRYING OUT THE INVENTION

Figure 1:
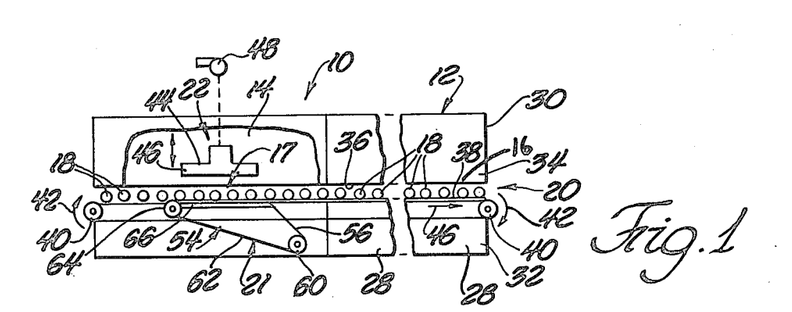
FIG. 1 is a schematic side elevation view of a glass sheet bending system including a main roller conveyor and an auxiliary roller conveyor.

Referring to FIG. 1 of the drawings, a glass sheet bending system indicated generally by reference numeral 10 includes a schematically indicated furnace 12 having a heating chamber 14 within which glass sheets are heated and bent. A horizontal roller conveyor system includes a main roller conveyor 16 and an auxiliary roller conveyor 17. Both conveyors 16 and 17 include rolls 18 that support glass sheets during conveyance through the heating chamber 14 and which have elongated shapes extending horizontally transverse to the direction of conveyance in a parallel relationship to each other. Each conveyor roll 18 has a central rotational axis. A drive mechanism 20 of the system drives the rolls of the main conveyor 16 about their rotational axes to provide conveyance of glass sheets supported on the rolls for heating within the furnace heating chamber 14.

A separate, variable speed drive 21 drives the rolls 18 of the auxiliary conveyor 17 adjacent bending apparatus 22 of the system in order to control movement thereof and glass sheet conveyance thereon independent of glass sheet conveyance on the rolls 18 of the main conveyor 16. It is also to be understood that many of the teachings of the present invention can also be applied to control the drive of an auxiliary conveyor located at a loading station, if required.

After each glass sheet G has been heated, bending apparatus 22 of the system receives the heated glass sheet to perform bending thereof in a manner which is hereinafter described.

The furnace 12 of the system includes a housing of the type disclosed by U.S. Pat. Nos. 3,934,970, 3,947,242 and 3,994,711 wherein a fixed lower housing 28 that opens upwardly and a vertically movable upper housing 30 that opens downwardly cooperatively define the heating chamber 14 in a lower closed position of the upper housing. An upper open position of the upper housing 30 provides access to the heating chamber for removal of glass when necessary as well as for maintenance of the conveyor system. In the lower closed position, insulated lower and upper side walls 32 and 34 at each lateral side of the furnace define side slots 36 through which opposite ends of the conveyor rolls 18 project for rotational driving thereof by the drive mechanism 20 and the variable speed drive 21 to provide glass sheet conveyance.

The drive mechanism 20 for the main conveyor 16 preferably is of the frictional drive type disclosed by U.S. Pat. Nos. 3,806,312, 3,934,970, 3,947,242, 3,994,711 and 4,133,667. A pair of continuous drive loops 38 of the drive mechanism are embodied by solid steel belts or toothed chains and respectively drive the roll ends that project outwardly from the furnace heating chamber through the adjacent side slots 36. Each drive loop 38 is received by an associated pair of sheaves 40 and includes an upper driving reach that is slidably supported on a horizontal support member (not shown) that extends the length of the conveyor outside of the heating chamber and alongside the adjacent side slot 36. The external location of the driving reach with respect to the heating chamber provides a lower use temperature and thereby minimizes maintenance as well as permitting the drive loop to be embodied by a chain that includes toothed links connected by pins. Such chain type drive loops permit the sheaves 40 to have teeth that establish a positive driving relationship with the sheaves as opposed to friction developed by the wrap tension as is the case with solid steel belts, and the chains also permit the sheaves to have a much smaller diameter than can be utilized with solid steel belts due to the smaller radius of curvature the chains can assume.

The right sheave 40 of each drive loop 38 is rotatively driven in a clockwise direction as shown by arrows 42 of FIG. 1 so as to pull the upper driving reach toward the right and thereby also rotates the left sheave 40 in a clockwise direction. Longitudinal positioners (not shown) locate the opposite ends of the rolls 18 with respect to the support member along the direction of conveyance while permitting rotation of the rolls. Each roll end is supported on and frictionally driven by the driving reach of the adjacent drive loop 38 so as to provide the glass sheet conveyance.

Figure 3:
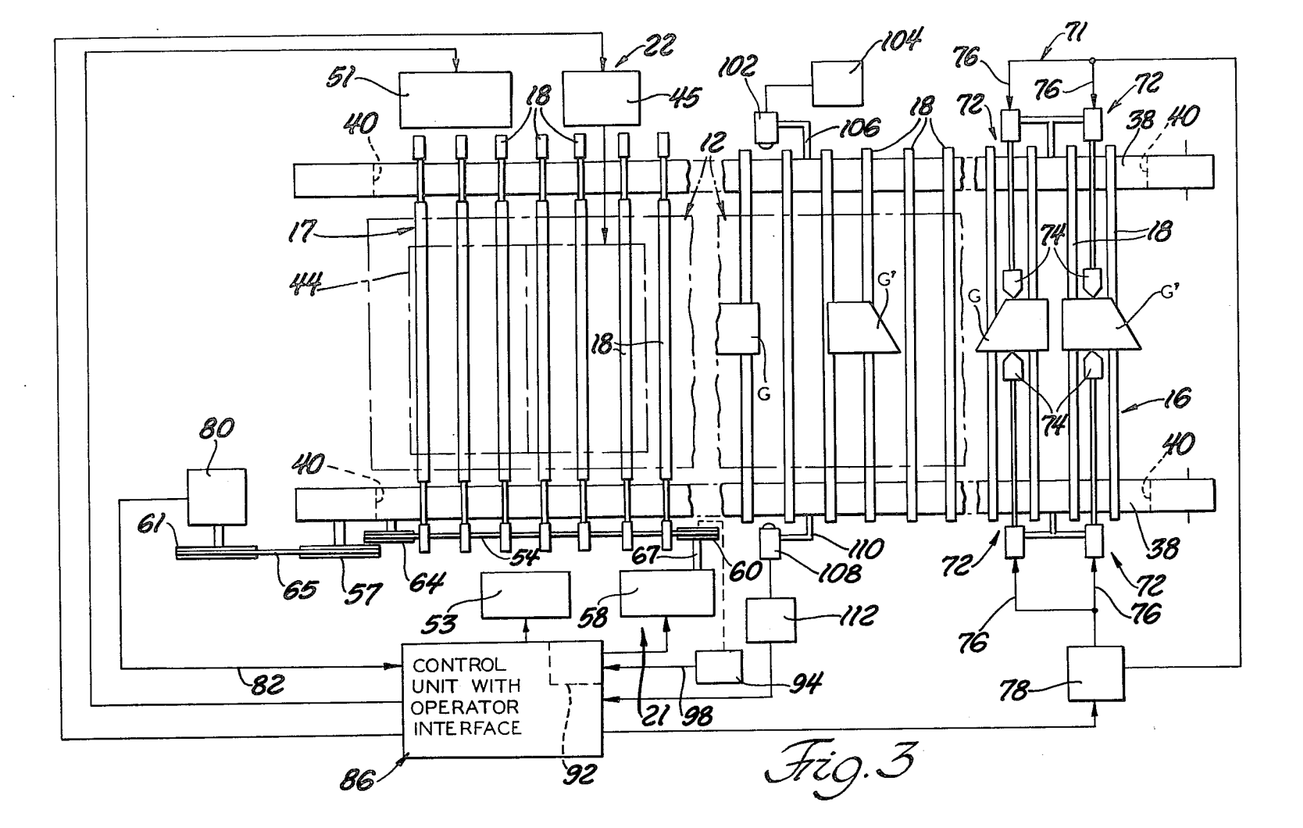
FIG. 3 is a top plan schematic view of a control system in conjunction with the glass bending system.

The bending apparatus 22 shown in FIG. 1 is of the type disclosed by U.S. Pat. Nos. 4,202,681, 4,204,854, 4,222,763, and 4,282,026 wherein a vertically movable holder 44 has a downwardly facing surface 46 with restricted openings spaced over the extent thereof and connected to a vacuum drawing unit 48 that draws a vacuum within the openings. The holder 44 is alternately and selectively raised or lowered by a holder lift unit 45 as shown by FIG. 3 which is of the type shown in the U.S. Pat. No. 4,282,026. Downward movement of the holder 44 into proximity with a heated glass sheet G conveyed thereunder and drawing of the vacuum lifts the heated glass sheet so as to be secured to the downwardly facing holder surface 46. Upward movement of the holder 44 and subsequent movement of a mold shuttle 50 under the raised holder is followed by termination of the drawn vacuum such that the lifted glass sheet G is dropped onto a mold 52 on the shuttle for bending. Thereafter, movement of the shuttle 50 out of the furnace heating chamber 14 to one of a pair of quench units 51 and 53 provides tempering of the bent glass sheet.

Figure 2:
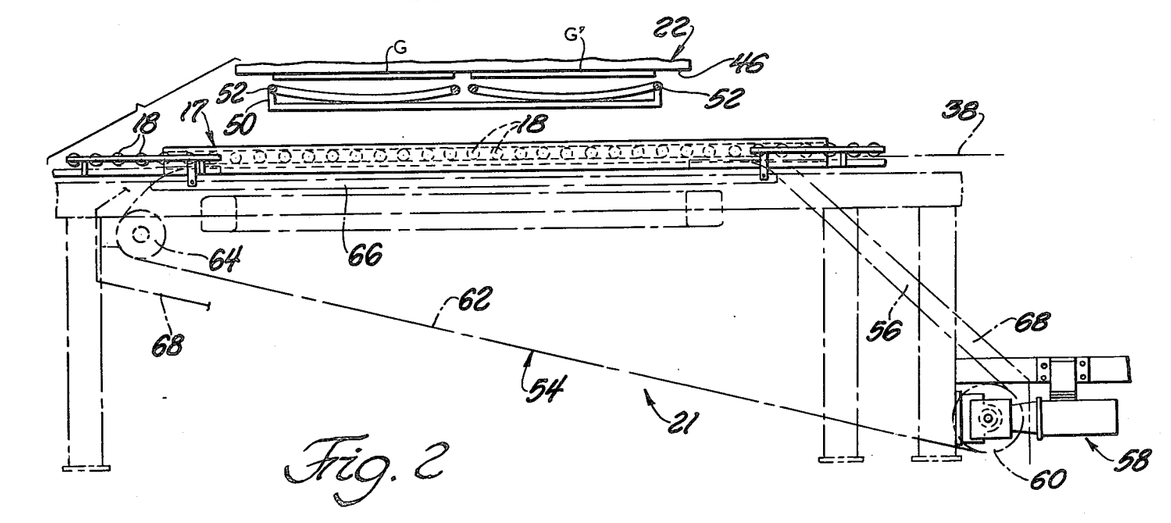
FIG. 2 is a view of a portion of FIG. 1 but on an enlarged scale to more clearly illustrate the positioning drive.

With reference to FIGS. 1 and 2, the variable speed drive 21 includes at least one and preferably two continuous drive loops 54 (only one of which is shown in FIG. 3 for simplicity) which is preferably embodied by a roller chain that drives rolls 18 of the auxiliary conveyor 17 adjacent the bending apparatus 22. As previously described the drive mechanism 20 includes a second continuous drive loop 38 for driving the rolls 18 of the main conveyor 16 upstream and downstream from the bending apparatus 22 (only the upstream rolls 18 of the main conveyor 16 are shown in FIG. 3 for simplicity).

At the upstream end of the main conveyor 16 a crossshaft (not shown) connects the sheaves 40. The drive mechanism 20 drives the sheaves 40 by a digital drive motor such as a D.C. motor (not shown).

With reference to FIG. 2, the drive loops 54 of the variable speed drive 21 each have a reach 56 extending downwardly from the conveyor to an electric motor and preferably a D.C. servo motor 58 which includes a driving sprocket 60 mounted on its shaft 67 as shown in FIG. 3. Each drive loop 54 also includes a reach 62 that extends from the drive sprocket 60 upwardly in an inclined orientation to an idler sprocket 64.

The drive loop 54 includes a driving reach that extends along a support member 66 to provide roll driving. At the opposite end of the support member 66 from the idler sprocket 64, the drive loop 54 is connected to the reach 56 thereof extending downwardly to the drive sprocket 60. A suitable cross-shaft connects the pair of drive sprockets 60 at the opposite sides of the system. Also, a schematically indicated guard 68 encloses each first drive loop 54.

Figure 4:
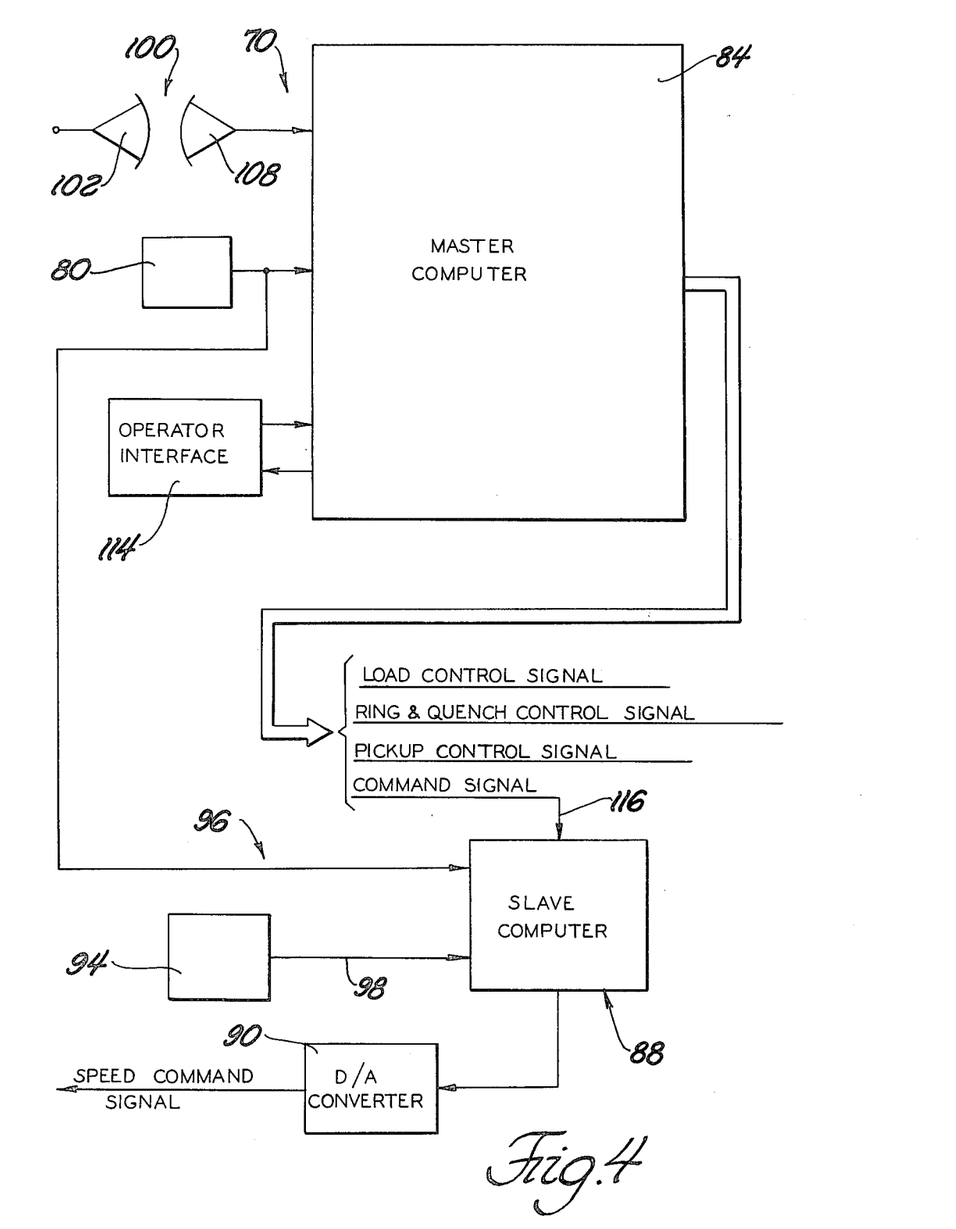
FIG. 4 is a schematic representation of a control system including a controller of the present invention.

Referring to FIGS. 3 and 4 of the drawings, there is collectively indicated at 70 a control system for monitoring the position of a sheet of glass and for controlling glass processing machinery such as glass loading apparatus 71, the variable speed drive 21, the glass bending apparatus 22 and the quench units 51 and 53.

In processing pairs of sheets of glass the loading apparatus 71 generally includes two loaders 72 for supporting a pair of glass sheets G and G' above the main conveyor 16 prior to dropping the sheets G and G' onto the main conveyor 16. Each loader 72 includes a housing 74 with a support (not shown) mounted thereon for movement from an extended position where the glass sheets G and G' are supported to a retracted position in order to drop the glass sheets G and G' onto the main conveyor 16. An actuator (not shown) of each support is air actuated along lines 76 from a compressed air source 78 which, in turn, is actuated by the control system 70.

At the downstream end of the main conveyor 16 a pulley 57 is connected to one of the sheaves 40 to rotate with the sheave 40. A second pulley 61 is driven by a chain 65 which is trained thereover and over the pulley 57. A commercially available incremental encoder 80 is mounted on a shaft of the second pulley 61 to sense the angular displacement of the shaft and hence the sheave 40. The incremental encoder 80 is able to withstand high operating temperatures of the furnace environment. Encoders employing semi-conductive components are generally unsuited due to the high temperature furnace environment.

The incremental encoder 80 emits a transport signal in the form of a shaft position signal along line 82. The incremental encoder 80 emits the shaft position signal in the form of a pulse every time the shaft of the DC motor rotates enough so as to move the glass sheet, for example, 0.01 inches.

The shaft position signal from the incremental encoder 80 is received by a preprogrammed master controller or computer 84 of a control unit 86. The shaft position signal is also received by a slave controller or computer 88 of the control unit 86. The slave computer 88 and a D/A converter 90 are contained on a monoboard 92 of the control unit 86.

The slave computer 88, the D/A converter 90, the first incremental encoder 80 and a second incremental encoder 94 comprise a positioning controller, generally indicated at 96, for supplying an analog control signal to the servo motor 58. The incremental encoder 94 is mounted on the shaft 67 of the servo motor 58. The incremental encoder 94 emits a second transport signal in the form of a shaft position signal along line 98. The incremental encoder emits the shaft position signal in the form of a pulse in a similar fashion as incremental encoder 80. The second shaft position signal is received by the slave computer 88.

Both the master and slave computers 84 and 88 use the shaft position signals as interrupt request signals to decrement or increment various timing counters within their RAM memories upon motion of the respective conveyors 16 and 17. When the master computer 84 receives the shaft position signal from the encoder 80 indicating forward movement of the master conveyor 16, various timing counters in the control computer are counted down or decremented as more fully described in the above-referenced patent application "Control System for Monitoring and Controlling the Processing of Glass Sheets in a Glass Processing Environment".

The control system 70 also includes a photoelectric sensor pair 100. The sensor pair 100 includes an energy emitting source unit 102 which is electrically connected to a power supply 104 to emit radiant electromagnetic energy in the form of modulated beams of infrared energy and which is removably mounted on one side of the main conveyor 16 by a mounting assembly 106. The sensor pair 100 also includes an energy receiving unit 108 which is adapted to receive and respond to a threshold, predetermined level of modulated infrared energy emitted by the source unit 102 and which is removably mounted on the opposite side of the main conveyor 16 by a mounting assembly 110. If the modulated infrared energy received by the receiver unit 108 is less than the predetermined level, a glass sense signal is provided by the receiver unit 108. The signal provided by the receiver unit 108 is subsequently demodulated by a demodulator 112 for input to the master computer 84 in a form which the master computer 84 can interpret. The receiver unit 108 includes a phototransistor adapted to receive and respond to the modulated infrared energy emitted by the source unit 102. The source unit 102 includes a photodiode which emits the modulated infrared energy received by the receiver unit 108.

Photodiodes and phototransistors which use modulated infrared energy are especially suited for sensing glass in a glass processing environment. For example, such a phototransistor is not responsive to extraneous infrared energy. Such infrared energy is emitted by the sun, light bulbs and other heat sources such as the furnace 12.

An operator interface or console in the form of a teletype unit 114 is utilized to input into the master computer 84 various data or set points and the control system 70 operates to control the bending system 10 as described in the above-referenced application "Control System for Monitoring and Controlling the Processing of Glass Sheets in a Glass Processing Environment", except for the control of the variable speed drive 21 which is controlled by the controller 96 as is described hereinbelow.

The variable speed drive 21 and the drive mechanism 20 provide conveyance at the same speed as the glass is moved onto the rolls 18 driven by the servo motor 58 under the control of the controller as is described in greater detail hereinbelow. At the appropriate time, the variable speed drive 21 is operated in order to decrease the rate of conveyance as the bending apparatus 22 initially receives each glass sheet to perform the bending. The rate of conveyance is decreased by the servo motor 58 under the control of the controller to a creep rate as is described in greater detail hereinbelow to reduce sliding and increase location accuracy between the holder surface 46 and each glass sheet as the holder 44 is moved downwardly and a differential gas pressure is supplied to the surface thereof by the vacuum unit 48 in order to secure the glass sheet for bending. Thereafter, upward movement of the holder 44 spaces each heated glass sheet above the auxiliary conveyor 17 to permit the shuttle 50 to move each mold 52 below the holder 44 to receive the glass sheets for bending under the impetus of gravity. This decrease in the rate of conveyance can be utilized when one, two, or any number of glass sheets are to be bent on a like number of molds carried by the shuttle 50.

When the two glass sheets G are to be bent such as is often the case with right and left vehicle windows, and upon movement of the leading glass sheet onto the conveyor rolls 18 driven by the variable speed drive 21, the servo motor 58 under the control of the positioning controller increases or decreases the rate of conveyance of the rolls 18 of the auxiliary conveyor 17 in order to reposition the leading glass sheet upstream or downstream with respect to the trailing glass sheet supported on the rolls 18 of the main conveyor 16 driven by the drive mechanism 20 upstream from the bending apparatus 22. After the proper positioning has been provided, the variable speed drive 21 drives the conveyor rolls 18 adjacent the bending apparatus 22 at the same speed as the rolls 18 of the main conveyor 16 so that the trailing glass sheet can be received by the rolls driven by the variable speed drive 21 for conveyance with the leading sheet below the holder 44 in preparation for the bending cycle as previously described.

When a pair of leading and trailing glass sheets are to be bent, the servo motor 58 under control of the positioning controller provides a two step operation of the variable speed drive 21. Initially, the variable speed drive 21 is operated in order to reposition a first leading glass sheet supported by the rolls driven thereby with respect to a second trailing glass sheet upstream from the bending apparatus 22. Thereafter, the variable speed drive 21 is operated with both the first leading glass sheet and the second trailing glass sheet on the rolls driven thereby in order to decrease the rate of conveyance as the holder 44 of the bending apparatus 22 initially receives both glass sheets in preparation for lifting the glass sheets above the conveyor for bending.

The slave computer 88 preferably comprises a conventional microcomputer system including a microprocessor, a clock for the microprocessor, a random access memory (RAM), a programmable readonly memory (PROM) or an electrically programmable read-only memory (EPROM), an interface adaptor such as a VIA, and an asynchronous communications interface adaptor (ACIA) and the associated data, address and control busses.

A communication line, preferably comprising an RS232 serial line 116, allows the master computer 84 to communicate with the slave computer 88 by means of various command signals. The line 116 is used as a unidirectional port to send commands to the slave computer 88 which, in turn, generates a digital speed control signal which is subsequently converted to an analog speed control signal by the D/A converter 90.

Figure 5:
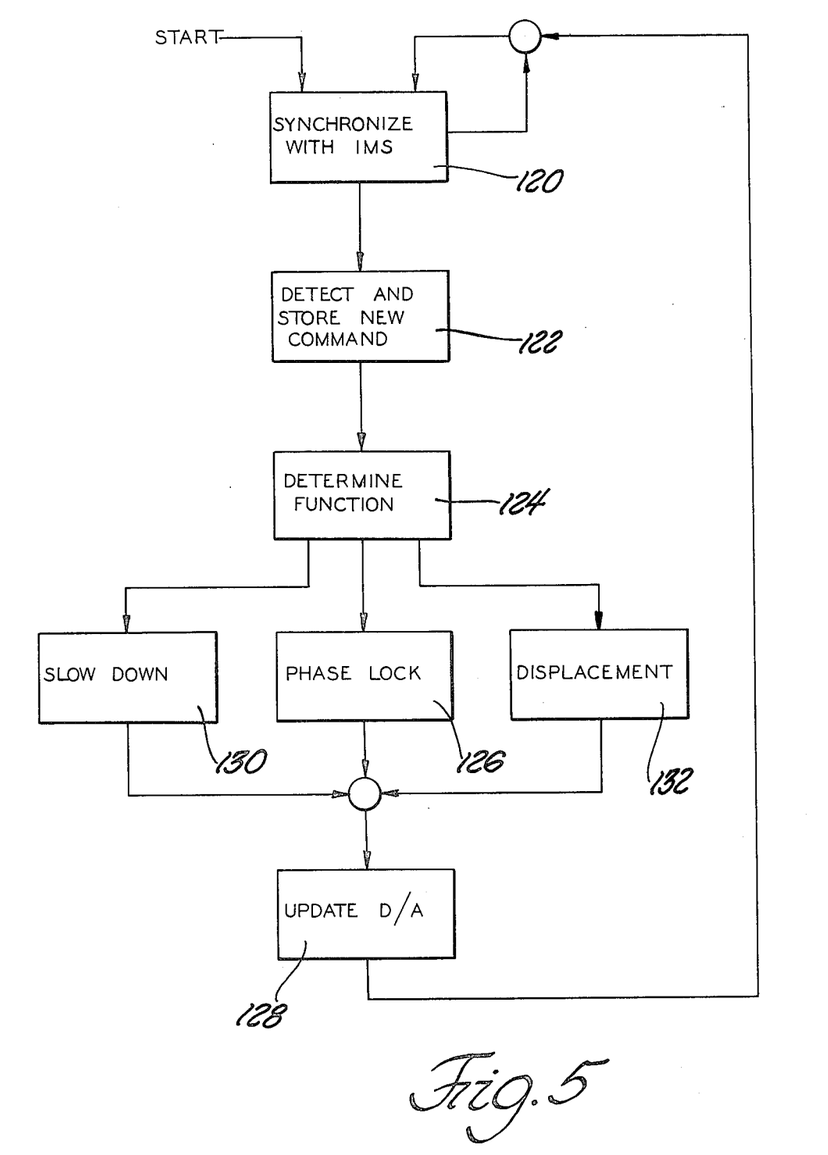
FIG. 5 is a representation of a control program followed by the controller of the present invention.
Figure 7:
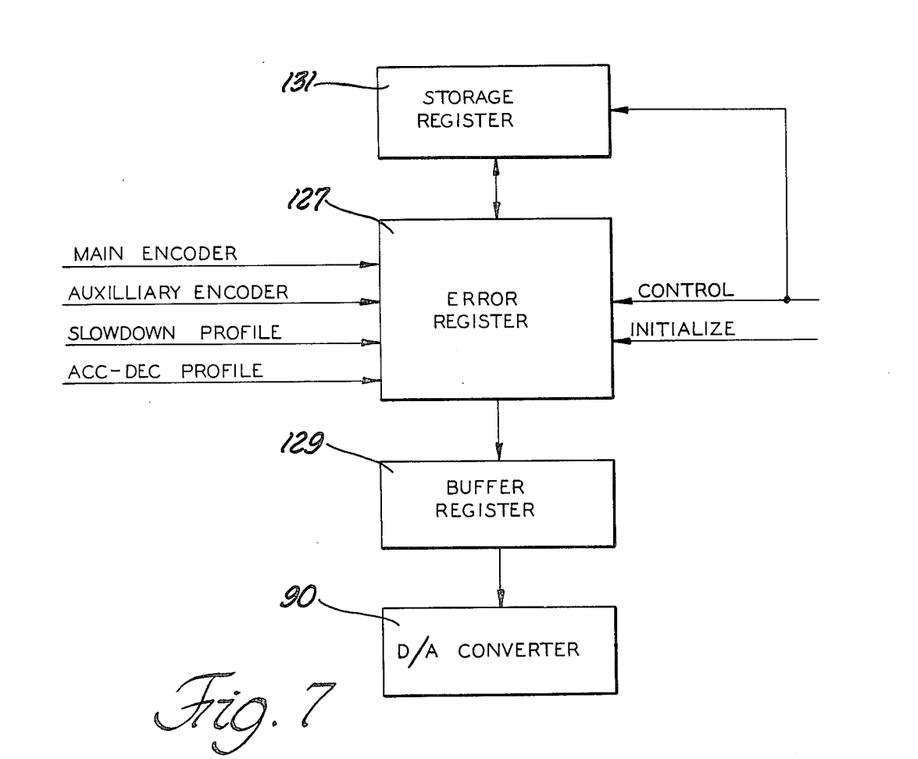
FIG. 7 is a representation of a portion of the control program of FIG. 5.

Referring now to FIGS. 5 and 7, there is illustrated in block diagram form a control program for controlling the operation of the slave computer 88 to enable it to provide the desired speed control signals to the D/A converter 90 which, in turn, converts these signals to an analog level prior to use by the servomotor 58.

In general, the auxiliary conveyor 17 is controllably driven in three different modes of operation. The primary mode is called the phase-lock mode and is a default mode entered in the absence or completion of any other action or mode. The default mode may also be entered directly upon command from the master computer 84. In this mode, the slave computer 88 adjusts the speed control signal emitted by the controller 96 to keep the two incremental encoders 80 and 94 tracking and consequently keep the speeds of the main and auxiliary conveyors 16 and 17 substantially identical.

The second mode of operation is a displacement mode which is entered by the controller 96 upon receiving a displacement command from the master computer 84. The displacement command causes the controller 96 to output a speed control signal to the servomotor 58 which will cause the auxiliary conveyor 17 to either speed up or slow down for a period of time determined by the displacement command so that after this time the downstream glass sheet being conveyed by the auxiliary conveyor 17 will have moved away or toward its companion part on the main conveyor 16.

Figure 6:
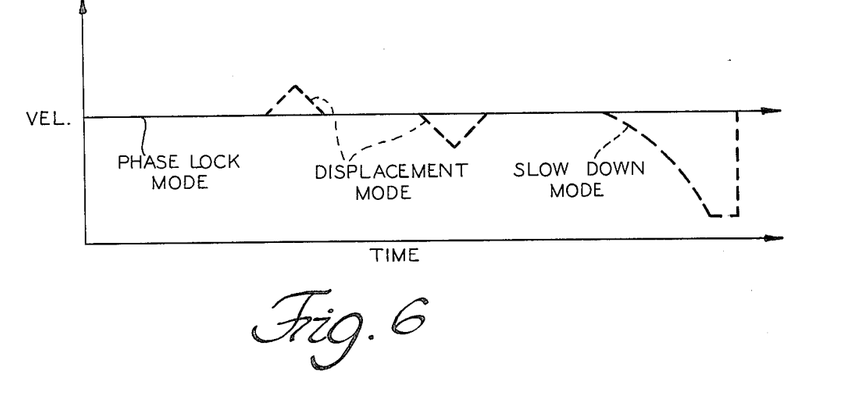
FIG. 6 is a graph of glass sheet velocity versus time illustrating the three modes of operation of the auxiliary conveyor as controlled by the controller.

The third mode of operation in which the auxiliary conveyor 17 is controlled to operate by the controller 96 is called the slow-down mode. The purpose of the slow-down mode is to slow down the auxiliary conveyor 17 during glass sheet removal or pickup from the auxiliary conveyor 17. As in the displacement mode, the slow-down mode is timed and initiated from the master computer 84. The auxiliary conveyor 17 slows to a predetermined low speed as shown in FIG. 6 for a short time and is then returned to the phase-lock mode. This motion is determined from a table in the ROM which is accessed in the slow-down mode of the program of FIG. 5 and provides a given shift amount for each point of conveyor travel.

Referring again to FIG. 5, block 120 represents a one millisecond delay before the main body of the program of FIG. 5 is entered. Block 122 represents the detection and storing of a new command received by the slave computer 88 from the master computer 84 along line 116. At any time during the control program, if a new command is issued from the master computer 84 an interrupt will occur and the interrupt will be serviced. Block 122 represents, therefore, the detection of the particular command after an interrupt has occurred.

Block 124 represents the determination of which one of the three possible commands has been sent from the master computer 84 so that the slave computer 88 can determine whether to enter its slow-down mode, represented by block 130, the phase-lock mode, represented by block 126, or the displacement mode, represented by block 132.

An error register 127 is alternately incremented or decremented by square wave signals from the encoders 80 and 94, respectively, after the contents of register 127 are set or initialized at a value representing the desired velocity of both the main and auxiliary conveyors 16 and 17, as shown by the solid horizontal line in FIG. 6. A buffer register 129 receives the count from the error register 127 after the error register 127 receives an appropriate control signal as represented by block 128. The count contained in the buffer register 129 is supplied to the D/A converter 90. The square waves are received by the VIA of the slave computer 88 from the encoders 80 and 94. When there is no difference in the speed of the main and auxiliary conveyors 17 and 16, respectively, the error register 127 contains a binary number corresponding to the velocity of the auxiliary and main conveyors 16 and 17. If the pulses from the encoder 80 appear at a greater frequency than the pulses from the encoder 94, the count contained within the error register 127 will be greater than its set, predetermined amount to cause the magnitude of the speed control signal emitted from the D/A converter 90 to temporarily increase until the count contained within the error register 127 settles to the predetermined amount.

Alternately, if the count within the error register 127 falls below the set count, the magnitude of the speed control signal from the D/A converter 90 will decrease until a greater number of pulses from the encoder 80 cause the count within the error register 127 to settle at the predetermined amount.

As previously mentioned, block 128 represents the function of the program of FIG. 5 to update the signals applied to the D/A converter 90 from the buffer register 129, with the desired count contained within the error register 127.

Block 130 represents that function of the control program which causes the auxiliary conveyor 17 to operate at the velocity profile as shown in FIG. 7 with respect to the slow-down mode. The block 130 causes the old value stored in the error register 127 to be stored in a storage register 131 and causes the value contained in the error register 127 to be counted down gradually until the minimum speed of the auxiliary conveyor 17 is reached as indicated by the minimum velocity position of the slow-down curve. Finally, in block 130 the old stored values are returned from the storage register 131 to the error register 127 to cause the speed of the auxiliary conveyor 17 to return to that desired speed of the phase-lock mode.

With respect to block 132 in which the displacement mode is entered, it is initially determined whether a positive or negative displacement is indicated by the command from the master computer 84. If a positive displacement is commanded the count within the error register is increased at a fixed rate until half of the command displacement is reached as determined by an acceleration profile generated from the command signal and the internal clock. At this point the speed control signal causes the auxiliary conveyor 17 to move at its maximum speed. The area under the acceleration curve to the maximum speed represents one-half of the displacement commanded. Thereafter the speed control signal from the D/A converter 90 is thereafter gradually reduced at the same rate as the speed was initially increased by a deceleration profile until the phase-lock area underneath the velocity displacement curve represents the entire displacement commanded.

In like fashion, if a negative displacement is required the velocity curve or profile ramps down from the phase-lock velocity at a fixed rate of deceleration and then ramps upward at the same rate as the deceleration. Again, if a negative displacement is required, one-half of the displacement is obtained during the ramping down and the other half of the displacement is obtained during the ramping up. Thereafter the phase-lock mode is reentered and the control program is repeated, but only until after one millisecond has elapsed since the prior beginning of the control program as illustrated by block 120.

The VIA of the slave computer 88 causes an interrupt to occur and be serviced at every one millisecond to update a timer contained within the slave computer 88. In like fashion, interrupts also occur and are serviced upon the occurrence of each pulse generated by the encoders 80 and 94 as well as when a command is received by the slave computer 88 from the master computer 84.

While the best mode for carrying out the invention has herein been described in detail, those familiar with the art to which this invention relates will recognize various alternative designs and embodiments for practicing the present invention as defined by the following claims.

What is claimed is:

1. In a control system which monitors and controls the processing of sheets of glass in a glass processing system wherein the sheets of glass are conveyed by a main conveyor and an auxiliary conveyor driven by a separate, variable speed drive for conveying the sheets of glass between the main conveyor and the auxiliary conveyor, the control system including a master controller to provide a command signal and a positioning controller for controlling the variable speed drive, the positioning controller comprising:

first generating means coupled to the main conveyor for generating a first transport signal corresponding to the distance that the glass sheets are conveyed along the path of conveyance on the main conveyor;

a second generating means coupled to the auxiliary conveyor for generating a second transport signal corresponding to the distance that glass sheets are conveyed along the path of conveyance on the auxiliary conveyor;

a slave controller for processing the command signal from the master controller and the first and second transport signals from the first and second generating means, respectively, to provide at least one control signal to the variable speed drive to control glass sheet conveyance on the auxiliary conveyor independent of the glass sheet conveyance on the main conveyor.

2. In a control system which monitors and controls the processing of sheets of glass in a glass processing system wherein the sheets of glass are conveyed by a main roller conveyor and an auxiliary roller conveyor adjacent a bending apparatus of the glass processing system and driven by a separate, variable speed drive for reconveying the sheets of glass from the main conveyor to a bending station, each of the sheets of glass being removed from certain rolls of the auxiliary conveyor by the bending apparatus to perform bending thereof, the control system including sensor means located along the path of conveyance for sensing the glass sheets as the glass sheets are conveyed by the main conveyor past the sensor means and providing glass sense signals upon sensing the glass sheets; and a master controller for processing the glass sense signal corresponding to each glass sheet to provide a command signal; a positioning controller for controlling the variable speed drive, the positioning controller comprising:

first generating means coupled to the main conveyor for generating a first transport signal corresponding to the distance that the glass sheets are conveyed along the path of conveyance on the main conveyor;

a second generating means coupled to the auxiliary conveyor for generating a second transport signal corresponding to the distance that glass sheets are conveyed along the path of conveyance on the auxiliary conveyor;

a slave computer for processing the command signal from the master controller and the first and second transport signals from the first and second generating means, respectively, to provide at least one digital control signal;

a converter coupled to the slave computer for converting the digital control signal to an analog signal to the separate variable speed drive of the auxiliary conveyor to control glass sheet conveyance thereon independent of the glass sheet conveyance on the main conveyor, wherein horizontal movement between each of the glass sheets and the bending apparatus is substantially reduced at the time each glass sheet is removed from the auxiliary conveyor.

3. In a control system which monitors and controls the processing of sheets of glass in a glass processing system wherein the plurality of sheets of glass are conveyed by a main roller conveyor and an auxiliary roller conveyor adjacent a bending apparatus of the glass processing system and driven by a separate, variable speed drive for reconveying the plurality of sheets of glass from the main conveyor to a bending station, each of the plurality of sheets of glass being removed from certain rolls of the auxiliary conveyor by the bending apparatus to perform bending thereof, the control system including sensor means located along the path of conveyance for sensing the glass sheets as the glass sheets are conveyed by the main conveyor past the sensor means and providing glass sense signals upon sensing the glass sheets; and a master controller for processing the glass sense signal correspond to each glass sheet to provide a command signal; a positioning controller for controlling the variable speed drive, the positioning controller comprising:

- first generating means coupled to the main conveyor for generating a first transport signal corresponding to the distance that the glass sheets are conveyed along the path of conveyance on the main conveyor;
- a second generating means coupled to the auxiliary conveyor for generating a second transport signal corresponding to the distance that glass sheets are conveyed along the path of conveyance on the auxiliary conveyor;
- a slave computer for processing the command signal from the master controller and the first and second transport signals from the first and second generating means, respectively, to provide at least one digital control signal;
- a converter coupled to the slave computer for converting the digital control signal to an analog control signal and providing the analog control signal to the variable speed drive of the auxiliary conveyor to control glass sheet conveyance thereon independent of the glass sheet conveyance on the main conveyor, wherein the downstream glass sheet of each plurality of glass sheets is moved to a desired fixed position relative to at least one upstream glass sheet to insure proper removal of the plurality of glass sheets by the bending apparatus.

4. In a control system which monitors and controls the processing of sheets of glass in a glass processing system wherein the sheets of glass are conveyed by a main roller conveyor and an auxiliary roller conveyor adjacent a bending apparatus of the glass processing system and driven by a separate, variable speed drive for reconveying the sheets of glass from the main conveyor to a bending station, each of the sheets of glass being removed from certain rolls of the auxiliary conveyor by the bending apparatus to perform bending thereof, the control system including sensor means located along the path of conveyance for sensing the glass sheets as the glass sheets are conveyed by the main conveyor past the sensor means and providing glass sense signals upon sensing the glass sheets; and a master controller for processing the glass sense signal corresponding to each glass sheet to provide a command signal; a positioning controller for controlling the variable speed drive, the positioning controller comprising:

- First generating means coupled to the main conveyor for generating a first transport signal corresponding to the distance that the glass sheets are conveyed along the path of conveyance on the main conveyor;
- a second generating means coupled to the auxiliary conveyor for generating a second transport signal corresponding to the distance that glass sheets are conveyed along the path of conveyance on the auxiliary conveyor;
- a slave computer for processing the command signal from the master controller and the first and second transport signals from the first and second generating means, respectively, to provide at least one digital control signal;
- a converter coupled to the slave computer for converting the digital control signal to an analog signal and providing the analog control signal to the variable speed drive of the auxiliary conveyor to control glass sheet conveyance thereon independent of the glass sheet conveyance on the main conveyor.

5. The controller as claimed in claims 1, 2, 3 or 4 wherein at least one of said first and second generating means comprises encoder means associated with the output shaft of a drive motor of the variable speed drive for providing a signal representation of the angular displacement of the output shaft.

* * * * *